June 22, 1954
T. E. COFFMAN
2,681,724
LUMBER BUNCHING MACHINE
Filed Dec. 26, 1951
2 Sheets-Sheet 1
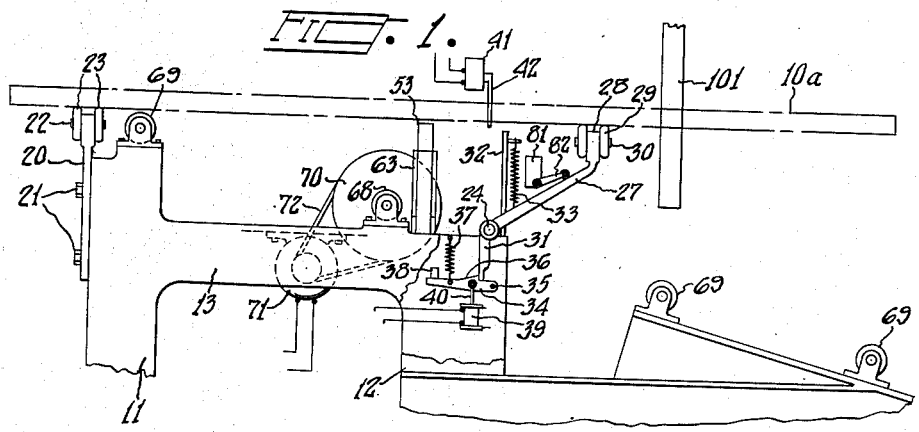
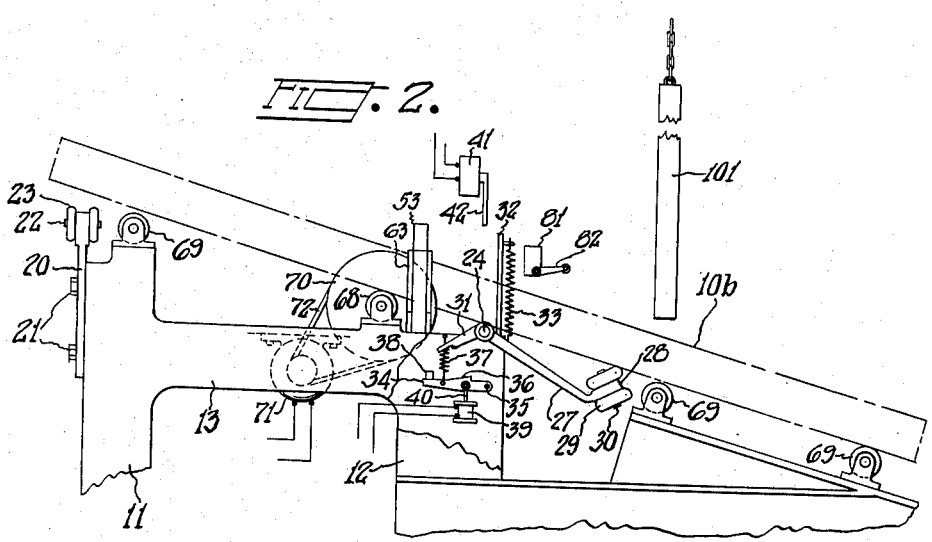
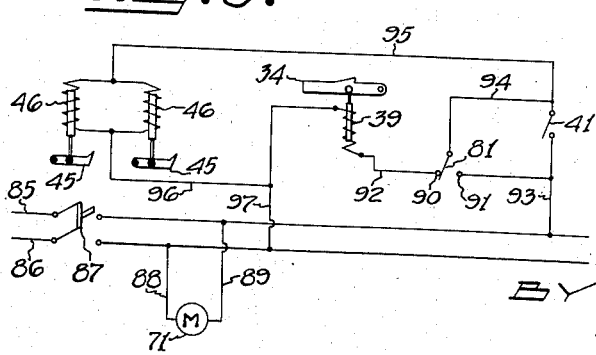
INVENTOR
THOMAS E. COFFMAN
BY Cook and Schermerhorn
ATTORNEYS June 22, 1954
T. E. COFFMAN
2,681,724
LUMBER BUNCHING MACHINE
Filed Dec. 26, 1951
2 Sheets-Sheet 2
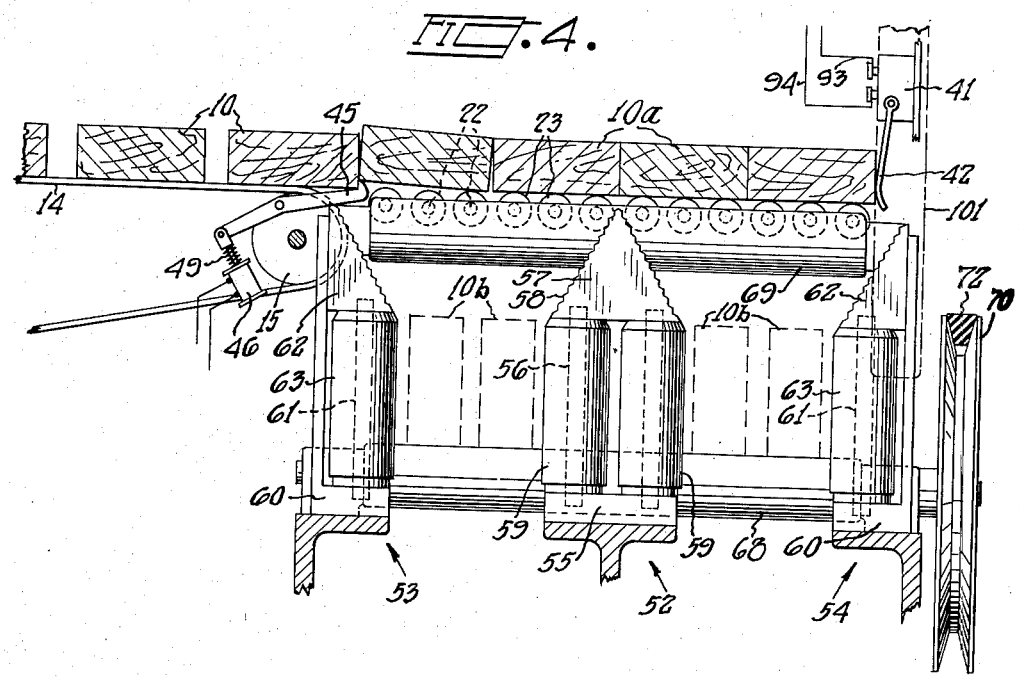
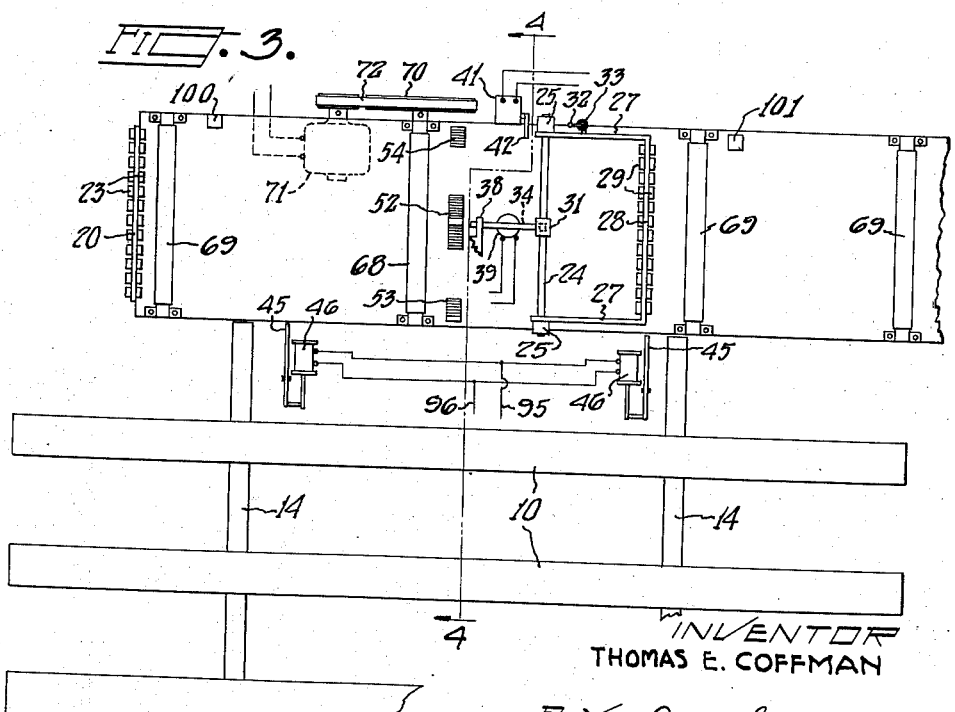
INVENTOR
THOMAS E. COFFMAN
BY Cook and Schermerhorn
ATTORNEYS Patented June 22, 1954

2,681,724

UNITED STATES PATENT OFFICE 2,681,724

LUMBER BUNCHING MACHINE

Thomas E. Coffman, Myrtle Point, Oreg.

Application December 26, 1951, Serial No. 263,348

13 Claims. (Cl. 198—31)

This invention relates to a machine for bunching lumber to facilitate the manual handling thereof.

Some sawmills specialize in the production of one particular size of lumber, such as 2 inch by 4 inch by 8 foot studding, making it advantageous to utilize special purpose equipment designed for the standardized product. The general object of the present invention is to provide apparatus to facilitate the handling of such lumber, particularly for shipment, as in the loading of railway cars and other means of conveyance. Heretofore, it has been the practice to pick up the pieces directly from a delivery conveyor which discharges the boards from the mill, one after another. The boards arrive with sufficient rapidity to make it difficult to grasp several at a time and remove them from the path of the oncoming boards without danger of injury. The hazard and general awkwardness of this phase of the loading operation results in inefficient and excessive costs relative to the primary mill operations.

Further and more specific objects of the invention are therefore to provide a bunching machine to receive the random delivery and group the boards in small bunches, such as pairs, for convenient manual pick-up, and to provide a machine to accumulate a predetermined number of boards and then deliver them in pairs simultaneously to a pick-up station removed from the point of accumulation and not subject to the hazards and congestion of the delivery conveyor from the mill.

The mechanism of the invention is mounted on a frame adjacent the end of a conveyor to receive boards being conveyed edgewise in a flat position as from a sawmill. A plurality of rollers form an accumulating platform to receive a predetermined number of the boards, such as four. When the platform is filled, one end is automatically released to fall by gravity. Mounted on the frame are a plurality of stationary upstanding tumblers arranged in the path of fall of the boards when the platform is released to turn the boards on edge and place them in pairs face to face. Another conveyor then receives the boards to carry them away from the machine in pairs for manual pick-up.

The invention will be better understood and additional objects and advantages will become apparent from the following description taken in connection with the accompanying drawings, which illustrate a preferred form of the device. It is to be understood, however, that the invention may take other forms, and that all such modifications and variations, within the scope of the appended claims, which will occur to persons skilled in the art, are included in the invention.

In the drawings:

Figure 1 is a side elevation view of the invention showing a board supported on the platform of the machine;

Figure 2 is a view similar to Figure 1 but showing the platform in lowered position and the board turned on edge;

Figure 3 is a top plan view;

Figure 4 is an enlarged sectional view taken on the line 4—4 of Figure 3 showing the board tumblers, certain parts being eliminated to clearly show said tumblers; and Figure 5 is a schematic wiring diagram showing the electrical system for the machine.

The illustrated embodiment of the invention discloses the turning and discharging of boards 10 on edge, in pairs in face to face relation. Referring first to Figure 1, the mechanism is supported by a frame having legs 11 and 12 and horizontal members 13. The frame is mounted at the end of conveyor belts 14, Figures 3 and 4, which pass over end pulleys 15, one pulley 15 being shown in Figure 4. The belts 14 convey boards 10 one after another in random spacing from a mill into the present mechanism.

Mounted on the legs 11 at one end of the frame is a plate 20 secured thereto by bolts 21, and mounted on the upper edge of said plate are a plurality of short axles 22 carrying pairs of rollers 23 on each side of the plate 20. A transverse shaft 24 is journaled in end bearings 25 above the legs 12 and carries a pair of arms 27, one on each side of the frame. Extending between the ends of the arms 27 is a bar 28 parallel with the plate 20 provided with a plurality of rollers 29 mounted on short axles 30, this set of rollers being horizontally aligned with the rollers 23 to form a platform or, with short rollers as shown, a pair of rests for boards to be received from the conveyor 14. Secured to the shaft 24 is a latch arm 31 which rotates with the shaft 24 and arms 27.

A rod 32 extends upwardly on one side of the frame and a tension spring 33 is secured between the top of the rod 32 and one of the arms 27, tending at all times to lift the arms to their Figure 1 position. The spring 33 is sufficiently strong to pivot the arms to their Figure 1 position when no boards are resting on the rollers 23 and 29, but when a load is received from the conveyor 14, the weight of the boards overcomes the tension of the spring, and the arms tend to move to their Figure 2 position.

A latch bar 34 is pivotally mounted on the frame at 35 and has a catch 36 with a vertical surface thereon for engaging the latch arm 31. A tension spring 37 holds the bar 34 up in firm engagement with a stop 38, and as shown in Figure 1 the catch 36 has an inclined back surface so that the latch arm 31 will depress the bar 34 and slide over the catch 36, hooking itself behind the vertical surface thereof when the arms 27 are lifted by spring 33. Mounted beneath the latch bar 34 is a solenoid 39 having a link 40 connected between the armature of the solenoid and the bar 34. When the solenoid is energized, and a load of boards is on the platform, the rod 40 will pull downwardly on the bar 34 and release the latch arm 31 from behind the catch 36, whereby the arms 27 pivot to the position shown in Figure 2 under the weight of the boards. The energization of the solenoid 39 is controlled primarily by a switch 41 having a switch finger 42 extending into the path of movement of the boards when loading the platform, so that when a board engages the finger 42 electrical current is supplied to energize solenoid 39. The electrical control system will presently be described in detail. Latch arm 31 is thus released to allow the shaft 24 and arms 27 to rotate and lower one end of the boards supported on rollers 29.

The movement of boards coming off the conveyor belts 14 and onto the rollers 23 and 29 is interrupted at such time by a pair of dogs 45, Figures 3 and 4, which are operated by solenoids 46. Compression springs 49 move the dogs 45 to disengaged position when the solenoids are deenergized. As seen in Figure 4, a board 10 has been engaged by the dogs 45 to hold back the following boards on belts 14 until the platform is returned to loading position. The continuously moving belts 14 slide freely under the boards 10 when they are so held.

Referring now to the mechanism for turning the boards on edge and conveying them in pairs away from the mechanism, Figure 4 shows boards 10a resting on the rollers 29 and also boards 10b turned on edge. The two positions of the boards are merely illustrative, because operation of the machine is such that boards 10a are not present on the rollers while other boards 10b are still in the machine. To turn the boards on edge there is provided a central tumbler 52 and two side tumblers 53 and 54. The central tumbler has a base portion 55 with apertures to receive upstanding rods 56. Mounted at the top of the rods 56 and having apertures to receive the rods, is a pointed head 57 having inclined surfaces provided with serrations 58. Vertical rolls 59 are rotatably mounted on the rods 56 and protrude slightly beyond the head and base of the tumbler. The side tumblers 53 and 54 are similarly constructed in that bases 60 support upright rods 61 which in turn support heads 62. The rods 61 have rollers 63 mounted thereon between the bases 60 and the heads 62. In the side tumblers 53 and 54, the heads have only one inclined edge, each of which is faced toward the central tumbler.

As best seen in Figure 4, the present machine is designed to handle four boards at a time, although more tumblers may be added as desired to handle a greater number of boards. When the arms 27 are released and they start to drop to their Figure 2 position, the pointed heads 57 and 62 divide the boards into groups of two and tilt them on their edges, as shown.

Means are provided to convey the boards away in their edgewise position which comprise a live roll 68 and a plurality of idle rolls 69 mounted on the frame of the machine, best seen in Figures 1 and 2. The live roll 68 has a pulley 70 on one end which is driven by an electric motor 71 through belt 72. The idle rolls 69 are mounted on an inclined plane, and the boards are discharged from the machine thereon, the live roll 68 giving the boards a start down the rolls. The rolls 56 and 63 on the three tumblers are adapted to turn freely on the rods 56 and 61, respectively, to minimize rubbing friction of the boards against the sides of the tumblers as they leave the machine. The rollers 29 preferably have rounded corners to minimize retarding friction against the bottom of boards 10b in Figure 2. A suitable stop may be provided at the foot of the incline to hold the bunched lumber for convenient manual pick-up.

As shown in Figures 1, 2 and 5, a switch 81 has a switch finger 82 adapted to be engaged by one of the arms 27, and this switch is connected in circuit with the solenoids 46 so that whenever the arms 27 move away from the switch, the solenoids 46 are energized, lifting the dogs 45 and preventing lumber from being conveyed onto the platform rollers 23 and 29.

With reference to the wiring diagram of Figure 5, power is supplied through a pair of line wires 85 and 86 having a main switch 87. Motor 71 is energized by a pair of leads 88 and 89, the motor running continuously as long as the switch 87 is closed.

Switch 81 is a single pole double throw switch having two contacts 90 and 91 connected with the respective wires 92 and 93, the movable switch arm being connected to a wire 94. Switch 41 is connected in parallel with switch arm 81 and contact 91, the wire 93 being connected with line wire 85. For convenience, the numerals designating the switches generally in Figure 1 have been applied to the respective switch arm elements in Figure 5.

Switch 41 and wire 94 are also connected to a wire 95 leading to the solenoids 46 on the dogs 45. Wires 96 and 97 connect these solenoids with the other line wire 86. Solenoid 39 for latch bar 34 is connected to wires 97 and 92, this circuit being completed through switches 81 and 41 and wires 94 and 93 at one phase of operation.

The normal positions of switches 41 and 81 are as shown in Figure 5 deenergizing solenoids 39 and 46. The dogs 45 are thereby depressed by springs 49, and the platform comprising rollers 23 and 29 is in position to receive the first board 10 from the conveyor belts 14, the arms 27 being latched in elevated position by the engagement of latch bar 34 with latch arm 31. Switch arm 81 is held in engagement with contact 90 by one of the arms 27 as shown in Figure 1.

To prevent the first board from coasting across the platform by momentum and prematurely engaging switch finger 42 and closing switch 41, one or both sets of the rollers 23, 29 may be inclined upwardly to arrest the motion of the boards after they leave the belts 14. In the present embodiment, however, the platform comprising rollers 23 and 29 is horizontal, and the movement of one end of the first board is arrested by a fixed stop 100, Figure 3. The other end of the first board strikes a ballistic retarder or arrester 101 comprising a heavy pendulous bar preferably pivotally suspended at its upper end by a chain or link, to intercept the board and absorb its impulse energy before the board can engage switch finger 42.

Bar 101 acts as a ballistic pendulum, arresting the advancing movement of the first board before the bar is deflected an appreciable amount, the kinetic energy of the board being instantaneously transferred to the bar, leaving the board substantially stationary. Subsequently, the following boards will bump into the first board and transmit their impact energy therethrough to the ballistic arrester 101 without moving the first board into engagement with switch finger 42. Thus, the platform becomes loaded with the four boards 10a without prematurely actuating the switch 41.

The platform now being filled, the fifth board arrives and exerts a steady push against the platform load by reason of the constant driving effort exerted by the moving belts 14 engaging the under surface of the fifth board trying to carry it forward. The ballistic arrester 101 responds freely to a steady force, allowing the four boards 10a to be pushed forward until the leading board engages switch finger 42 to close switch 41 as shown in Figure 4.

The closing of switch 41 completes a circuit through wires 93, 94, switch 81, wire 92, solenoid 39 and wire 97, to retract the latch bar 34 and allow bar 28 and rollers 29 to fall. A parallel circuit is simultaneously completed through wire 93, switch 41, wire 95, solenoids 46 and wires 96 and 97, to lift the dogs 45 into engagement with the fifth board to prevent its advance onto the platform. As the arms 27 drop under the weight of boards 10a, the first board leaves its engagement with finger 42 causing switch 41 to return to its normally open position. Arm 27 leaves its engagement with finger 82 causing switch arm 81 to leave contact 90 and engage contact 91. The circuit to solenoid 39 is thereby broken, but the circuit through solenoids 46 is restored around switch 41 through wire 94, switch 81 and contact 91 before the dogs 45 have time to release the fifth board, and said board is not permitted to be advanced at this time.

As the four boards engage the tumblers 52, 53 and 54 in dropping, they are tilted on edge in pairs as indicated at 10b in Figure 4, and discharged from the machine on rolls 68 and 69, as shown in Figure 2. As soon as the trailing edges of the four boards 10b have cleared the rollers 29, spring 33 raises these rollers back to their Figure 1 position, causing one of the arms 27 to engage switch finger 82 and return switch arm 81 back to engagement with contact 90. This switching operation deenergizes solenoids 46, allowing springs 49 to drop the dogs 45 and allow the fifth board temporarily engaged thereby to advance onto the platform rollers 23 and 29. The upward movement of arms 27 engages latch arm 31 with latch bar 34 before the fifth board has time to move onto the platform rollers 29. This operation completes the cycle, switches 41 and 81 being returned to their Figure 5 position and solenoids 39 and 46 being deenergized. The cycle repeats automatically as long as boards are supplied by belts 14.

The platform may be extended and additional tumblers provided to accommodate six or eight, or more, boards, in order to bunch a correspondingly greater number of pairs, but the present arrangement is advantageous for two loader workmen stationed to take the boards from the rolls 69, or suitable conveyor means in continuation thereof. In the present machine, two pairs of boards are delivered on the rolls 69 in each cycle of operation, making it convenient for two loaders to pick them up in pairs for manual placement in the intended transportation facility. While this manual operation is being performed, the machine delivers two more pairs of boards which are presented in convenient position to be picked up by the time the loaders are ready for them. Thus, the machine bunches the boards in pairs, which is the most convenient size of load of eight foot two by fours and the like for a workman to pick up and carry away quickly for manual placement. The workmen are relieved of the effort of the bunching operation, and do not have to dodge the oncoming boards to avoid injury to their hands in picking up each pair. Their objects of the invention are thereby accomplished in a relatively simple and inexpensive machine, which greatly reduces the manual effort required in handling large quantities of standardized pieces of lumber such as studding.

Having now described my invention and in what manner the same may be used, what I claim as new and desire to protect by Letters Patent is:

1. A lumber bunching machine comprising means to support a plurality of boards in edge abutting relation, means to divide said plurality of boards into groups of two and turn said boards on edge, and means to convey said boards from the machine in longitudinal movement supported on edge.

2. A lumber bunching machine comprising means for supporting boards in edge abutting relation, a plurality of upstanding pointed tumblers spaced two board widths apart beneath the boards on said supporting means, and means for producing relative vertical movement between said tumblers and supporting means to separate the boards in pairs and turn them on edge.

3. A lumber bunching machine comprising rest means for supporting the ends of boards disposed in edge abutting relation, means for lowering said rest means under one end of the supporting boards, upstanding tapered members below said rest means, said members engaging said boards when said rest means is lowered to separate and turn said boards on edge, and means to convey said boards from the machine in edgewise position.

4. A lumber bunching machine comprising rest means for supporting the ends of boards disposed in edge abutting relation, means for lowering said rest means under one end of the supported boards, upstanding tapered members mounted below said rest means, said members being arranged to turn said boards on edge and group said boards in pairs when said rest means is lowered to engage the boards with said members, and rolls extending between said members to carry said boards in edgewise position from the machine.

5. A lumber bunching machine comprising support means having a level loading and inclined unloading position for boards, a series of inclined rolls to receive said boards in unloading position of said support means, and stationary tumbler elements arranged to engage the boards in the unloading position of said support means to turn the boards on edge on said inclined rolls.

6. A lumber bunching machine comprising a frame, means on said frame to support a predetermined number of boards, said means having one end arranged to be lowered by gravity, means to automatically release said end of said supporting means when said predetermined number of boards is disposed on said supporting means, and a plurality of upstanding stationary tumblers engageable with the boards when said one end is lowered, to separate and turn the boards on edge.

7. A lumber bunching machine comprising two series of rollers forming a support for horizontal boards, a plurality of upstanding tumblers mounted below said support, and means to lower one of said series of rollers to engage said boards with said tumblers to turn the boards on edge and group them in pairs.

8. A lumber bunching machine comprising a support having spaced rests to hold a predetermined number of boards, one of said rests adapted to be lowered by gravity, means mounted beneath said support to separate and turn said boards on edge when said one rest is lowered, means to automatically release said one rest when said predetermined number of boards is placed on the support, and means to prevent operation of said release means by less than said predetermined number of boards.

9. A machine for bunching boards received from a conveyor and the like, comprising means adjacent said conveyor to stop the travel of boards into said machine, releasable supporting means for receiving a predetermined number of boards, means to automatically release said supporting means when said predetermined number of boards has been received, means mounted beneath said supporting means to turn said boards on edge when said supporting means is released, and means to actuate said stop means to stop the travel of boards onto said supporting means when said holding means is released.

10. A machine for bunching boards comprising a frame, a series of rollers on one end of said frame, a series of rollers on the other end of said frame, said two series of rollers being arranged to support boards in horizontal position, one of said series of rollers being mounted for vertical movement, and a plurality of upstanding members mounted below said rollers and having sloping surfaces to turn said boards on edge and group them in pairs when said one series of rollers is lowered relative to said members.

11. A machine for bunching boards comprising means to support a predetermined number of boards side by side in flat position, means to automatically lower one end of said boards when said predetermined number of boards is disposed on said supporting means, and a plurality of upright tumblers having pointed ends disposed approximately two board widths apart to project between the boards and turn them on edge when said one end of the boards is lowered.

12. A machine for bunching boards comprising a board supporting rest mounted for gravity movement from a loading position to an unloading position, a latch to hold said rest in loading position, means extending into the path of said boards in fully loaded position on said rest to release said latch, means to stop a moving board before it engages said release means but yieldable under steady pressure to permit said engagement, and a plurality of upstanding tumblers beneath said rest to engage the boards and turn them on edge when said rest moves to unloading position.

13. In a lumber bunching machine and the like, a rest mounted for gravity movement from a loading position to an unloading position to discharge a load of boards therefrom by gravity, means to advance boards onto said rest in edgewise movement, a ballistic retarder in the patch of advancing boards on said rest to absorb the impulse energy of a moving board and stop said board, said retarder being freely yieldable to steady pressure of the boards when the rest is fully loaded, and means engageable by the leading board on the rest to release the rest for movement to said unloading position when said retarder has yielded under steady pressure.

References Cited in the file of this patent

UNITED STATES PATENTS

| Number | Name | Date |
| --- | --- | --- |
| 765,473 | George | July 19, 1904 |